US011198339B2

United States Patent
De Stasio et al.

(10) Patent No.: US 11,198,339 B2
(45) Date of Patent: Dec. 14, 2021

(54) APPARATUS FOR DETECTING AND CHECKING DEFECTS ON A TIRE AT THE END OF A PRODUCTION PROCESS

(71) Applicant: TEKNA AUTOMAZIONE E CONTROLLO SRL, Foggia (IT)

(72) Inventors: Michele De Stasio, Foggia (IT); Salvatore Romano, Foggia (IT); Angelo Pagliuso, Foggia (IT)

(73) Assignee: TEKNA AUTOMAZIONE E CONTROLLO SRL

( * ) Notice: Subject to any disclaimer, the term of this patent is extended or adjusted under 35 U.S.C. 154(b) by 228 days.

(21) Appl. No.: 16/485,647

(22) PCT Filed: Feb. 14, 2018

(86) PCT No.: PCT/IB2018/000106
§ 371 (c)(1),
(2) Date: Aug. 13, 2019

(87) PCT Pub. No.: WO2018/150256
PCT Pub. Date: Aug. 23, 2018

(65) Prior Publication Data
US 2020/0047569 A1  Feb. 13, 2020

(30) Foreign Application Priority Data
Feb. 14, 2017  (IT) .......... 102017000016046

(51) Int. Cl.
*B60C 25/00*  (2006.01)
*G01M 17/02*  (2006.01)
*B29D 30/06*  (2006.01)

(52) U.S. Cl.
CPC ........ *B60C 25/002* (2013.01); *B29D 30/0633* (2013.01); *G01M 17/021* (2013.01); *G01M 17/027* (2013.01); *B29D 2030/0634* (2013.01)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS 6,124,925 A   9/2000 Kaneko et al.
6,615,650 B2  9/2003 Mahner
(Continued)

FOREIGN PATENT DOCUMENTS

| CN | 201555569 U | 8/2010 |
| CN | 105612415 A | 5/2016 |
| JP | 5837283 B2 | 12/2015 |

OTHER PUBLICATIONS

International Search Report, PCT/IB2018/000106, dated Jun. 6, 2018, 4 pages.
(Continued)

*Primary Examiner* — Andre J Allen
(74) *Attorney, Agent, or Firm* — Stinson LLP

(57) ABSTRACT

An apparatus for detecting and checking defects on a tire at the end of a production process, the apparatus comprising a workstation comprising a workbench comprising a rotating table for supporting a tire; a profilometer; a high-resolution color linear camera for scanning outer surfaces of tire tread and tire shoulders; mechanical supports for the profilometer and color linear camera; a data processor for storing and processing data detected by the profilometer and the color linear camera means, for providing a three-dimensional model of a tire, and for management of a database including parameters referring to surface characteristics of defect-free tires; an interface for facilitating interaction between an operator and the apparatus; wherein the profilometer and the color linear camera are configured to operate simultaneously and perform a full scan of all the profiles of inner and outer surfaces of a tire while the tire is in rotation at a controlled
(Continued)

speed on the rotating table; and wherein the data processor is adapted to define and classify defects detected, by comparing parameters detected by the profilometer and the color linear camera to at least one corresponding parameter of a defect-free tire of a same type as a tire being tested.

14 Claims, 9 Drawing Sheets

(58) Field of Classification Search
CPC .... G01M 17/024; G01M 17/10; G01M 1/045; G01M 7/08; G01M 17/0076; G01M 17/013; G01M 17/03; G01M 17/04; G01M 17/06; G01M 17/08; G01M 1/02; G01M 1/12; G01M 1/16; G01M 1/225; G01M 3/04; G01M 3/40; G01M 5/0091; G01M 7/02; G01M 99/00; G01M 99/002; B60C 23/0494; B60C 2019/004; B60C 23/0493; B60C 23/064; B60C 19/00; B60C 23/04; B60C 23/0488; B60C 23/0498; B60C 23/0496; B60C 23/0408; B60C 23/041; B60C 23/0411; B60C 23/06; B60C 23/20; B60C 11/246; B60C 23/0486; B60C 23/061; B60C 11/243; B60C 99/00; B60C 11/0083; B60C 13/003; B60C 2009/2038; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/00491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/00; B60C 23/001; B60C 23/003; B60C 23/007; B60C 23/008; B60C 23/0413; B60C 23/0427; B60C 23/0447; B60C 23/0454; B60C 23/0457; B60C 23/0462; B60C 23/0471; B60C 23/0472; B60C 23/0476; B60C 23/0479; B60C 23/0483; B60C 23/0484; B60C 23/065; B60C 23/066; B60C 23/10; B60C 25/0548; B60C 25/056; B60C 25/132; B60C 25/138; B60C 29/005; B60C 9/005; B60C 9/18; B60C 9/1807; B60C 9/20; B60C 9/28; B29D 2030/0072; B29D 2030/0077; B29D 30/0633; B29D 30/0061; B29D 2030/0635; B29D 2030/0066; B29D 2030/728; B29D 2030/0665; B29D 30/0662; B29D 30/54; B29D 2030/546; B29D 2030/0638; B29D 2030/0642; B29D 30/0016; B29D 2030/0083; B29D 30/72; B29D 2030/0027; B29D 30/00; B29D 2030/0634; B29D 2030/541; B29D 30/0643; B29D 30/0685; B29D 30/26; B29D 30/52; B29D 2030/0088; B29D 2030/0686; B29D 2030/722; B29D 2030/724; B29D 30/0681; B29D 30/36; B29D 2030/0094; B29D 2030/0621; B29D 2030/0637; B29D 2030/0682; B29D 30/005; B29D 30/0601; B29D 30/08; B29D 30/242; B29D 30/70; B29D 2030/0689; B29D 2030/0695; B29D 22/023; B29D 30/04; B29D 30/06

USPC .................................................. 73/146–146.8
See application file for complete search history.

(56) References Cited

U.S. PATENT DOCUMENTS

| | | | |
|---|---|---|---|
| 7,805,987 B1 | 10/2010 | Smith | |
| 9,196,034 B2 | 11/2015 | Noyel et al. | |
| 10,006,836 B2 | 6/2018 | Monti et al. | |
| 10,121,238 B2 | 11/2018 | Krolczyk | |
| 10,267,710 B2 * | 4/2019 | Regoli | G01M 17/027 |
| 10,935,467 B2 * | 3/2021 | Held | G01N 21/95 |
| 2001/0024279 A1 | 9/2001 | Kaneko et al. | |
| 2005/0264796 A1 * | 12/2005 | Shaw | G01B 11/162 356/237.2 |
| 2011/0188731 A1 * | 8/2011 | Sekiguchi | G01N 21/8851 382/141 |
| 2015/0002847 A1 | 1/2015 | Sukegawa | |
| 2016/0225128 A1 | 8/2016 | Krolczyk et al. | |
| 2016/0320265 A1 | 11/2016 | Regoli et al. | |
| 2016/0377556 A1 | 12/2016 | Boffa et al. | |
| 2017/0370807 A1 | 12/2017 | Boffa et al. | |
| 2018/0189939 A1 * | 7/2018 | Piovan | G06K 9/2027 |
| 2018/0299353 A1 * | 10/2018 | Held | G01M 17/027 |
| 2020/0072704 A1 * | 3/2020 | Cantu' | G01M 17/027 |

OTHER PUBLICATIONS

Written Opinion, PCT/IB2018/000106, dated Jun. 6, 2018, 10 pages.

* cited by examiner

APPARATUS FOR DETECTING AND CHECKING DEFECTS ON A TIRE AT THE END OF A PRODUCTION PROCESS

REFERENCE TO RELATED APPLICATIONS

This application is a US national stage application based on PCT/IB2018/000106 filed Feb. 14, 2018 claiming priority to Italian application no. 102017000016046, filed Feb. 14, 2017, the entire disclosures of which are incorporated herein by reference.

FIELD OF THE INVENTION

The present invention relates to the field of the systems for the automation of the industrial production process of tires.

More in detail, the present invention relates to an apparatus and respective process for detecting the possible presence of defects on all surfaces of a tire at the end of the production process.

BACKGROUND

Tire, or pneumatics, are the elements which are mounted on the wheels and which allow the grip of the vehicle on the road.

They are one of the most important components of the vehicle because they are crucial for safety: by means of their small footprint, they allow the exchange of all the forces, which make it possible to accelerate, brake and steer the vehicle in all weather conditions.

The production process of a tire is based on the following main steps:
- compound: the rubber compound of tires consists of 30 types of rubber, filler and other components mixed in gigantic mixers to create a black rubbery compound ready for grinding;
- grinding: the cooled rubber is cut into strips which will form the basic structure of the tire;
- manufacturing: the tire is made proceeding from the inside out; the fabric elements, the steel belts, the beads, the steel wires, the tread and other components are placed in a specific tire manufacturing machine; the result is an unfinished product, known as a "raw tire";
- vulcanization: the raw tire is then vulcanized in molds heated at high temperature, by the vulcanization press, which by means of a balloon outside the tire, compresses all components toward the walls of the mold, conferring the final shape to the tire itself, including the tread pattern and the manufacturer's instruction on the shoulders;
- check: before being considered ready for delivery and sale, each tire is carefully checked by qualified and trained personnel to identify defects, eventually, by means of machines specially designed for detecting even the smallest defects or imperfections.

Today, all industries in the world which manufacture tires (for cars, motorcycles, trucks, bicycles, etc.) have implemented and installed sophisticated automatic tire production systems, starting from compound preparation, extrusion of the parts which make up the tire, bands, tread, beads, labels, etc., but the check step, i.e. the quality control at end of the production line, it is still performed manually by the operator, who touch and visually checks each tire, both inside and outside, searching defects which can be found visually and by touch.

Tire quality control is one of the most sensitive processes and the check for absence of defects on the product, which may have been occurred during the production process before marketing, is essential and must be performed on all manufactured tires; installing a machine which efficiently checks the absence of defects on the manufactured tires, positively improves the quality on tires production line.

The word "defect" means any deviation from a desired condition, independently from whether such a deviation causes a degradation in performance of the tire (which can thus be rejected or declassed) or may be a simple defect (e.g. concerning appearance), which does not cause the rejecting or declassing of the tire. Defects can be:
- of structural type: portions with non-vulcanized compound, alterations of shape, cuts, slipping in the carcass, eccentricity, presence of flats along the circumference of the tire, thicknesses of parts of the tire, distances exceeding acceptability limits, missing layers and the presence of the open joints during the assembling step, etc.,
- of surface type: presence of foreign bodies on the surface, scratches, scrapes, bubbles, detachments, fissures, bladders, missing elements, foreign bodies, excesses of rubber, lack of rubber, etc.,
- due to color: tire manufacturers use color for various purposes during the manufacturing step, and in particular:
  writing the commercial code of the tire on the tread,
  drawing colored lines for encoding the manufactured tire type; said colored lines are provided on the entire circumference of the tread; this encoding, read by means of color sensors on conveyors, is used to automatically dispatch the tire in the various manufacturing departments,
  highlight the tire brand,
  indicated by variations of the shade of black of the tire, may also highlight contaminations present in the rubber compound and escape of high-pressure air from the balloon inside the mold during the vulcanization step.

On current tire quality manual control station, the following operations are performed:
- transporting each tire to be tested to the work station,
- tire (inner and outer) manual testing to check deformations, scratches, vesicles, bubbles, etc.,
- tire (inner and outer) visual testing to check structural (or aesthetic) defects detectable by eye.

This type of "human" visual check has criticalities due to the repeatability of the operation, to the complexity of the parts to be analyzed and to the short and fast times imposed by the industrial production, and further does not provide an objective test of the tire because it is related to the conditions of the operators who are subject to many factors, such as fatigue, stress, physical state and other contingent factors, performing their task.

The technology processes, such as the tire automation production processes, may make it possible to reduce said criticalities and costs to benefit result objectivity.

Tire manufacturers are also seeking automated solutions for the defect checking activities which until now have been performed solely by operators who, because of long working shifts, wrongly release to the market many defective products, recurrent false negatives which at the end may damage corporate image reputation and customer retention, discarded products and environmental waste of raw materials and resources, and, ultimately, risks to the safety of drivers on the roads.

In other words, the idea underlying the study of these solutions starts from the observation that the visual quality control of industrial products is one of the most repetitive, albeit highly specialized, tasks.

The insertion of an automatic defect checking station in line, instead of the manual station with operator (three specialized operators on three work shifts), makes it possible to obtain a considerable yearly saving, in addition to obvious advantages of objective results and of guaranteed testing times.

Automatic stations for performing quality examination tests on some parts of the tires at the end of the production process are known in the prior art and make it possible to detect some defects on the end product, thereby providing a major competitive advantage to tire manufacturers, considering the incidence of the cost of skilled labor and the need for objectivity in each step of the check.

These are automatic stations mostly made by assembling single components, i.e. 3D cameras and automatisms, which do not provide a complete and fully integrated autonomous quality control system to be inserted as-is in the tire production process.

Some known systems (Sick, Cognex, Integro Technogies, Testindo) are based on the use of simplified equipments provided with controller for processing the acquired data, and not complete machines (see the apparatus according to the present invention), provided with devices and laser profilometers for testing a tire or its components and respective defects of structural and surface type.

Patents relating to systems and methods for testing tires are known in the prior art; some of the most relevant patents are listed below.

Patent document EP1148328 illustrates a method consisting in varying the pressure of a tire, causing consequent changes in the shape of the tire and of the structural features/defects; the light projected in particular points on the surface of the tire by means of triangulation is observed and acquired by a camera, the images are sent to a processing system and a model of the tire is processed, the process is repeated and the various models are compared for various tire pressures.

Said method however, after inflating the tire at different pressures and acquiring its different shapes at different pressures, detects structural differences of the tire but does not detect its defects; the system may only be used for testing the structural part of the tire out of the production line and requires the tire to be coupled to a rim to be able to inflate it.

Patent document WO2013/045594 describes a rapid analysis method of elements in relief on the inner surface of a tire, comprising the steps of: capturing a three-dimensional image of the surface by assigning to each pixel of the image a grayscale value proportional to the topographical elevation of that point, in order to obtain a starting image; transforming the captured image into an orthogonal reference system, in which the abscissa axis represents the circumferential values, and the ordinate axis represents the radial values; assigning to each pixel of the surface a value of height gradient by comparing its elevation with the elevation of a discrete and reduced number of points disposed on a straight line passing through the respective pixel and oriented in the circumferential direction.

Patent document IT102015000028956 illustrates a "Method and apparatus for detecting defects on the surface of tires" comprising the following steps: preparing the tire; acquiring a digital image, comprising a structure which comprises representative stretches of linear elements of a mesh in a surface portion and representative of possible elongated defects, said stretch of the structure having a respective orientation; providing a model of the mesh in the surface portion, in which each pixel is associated with a first index representing whether the pixel belongs to a mesh portion or not and a second index representative of an orientation at least local of the mesh stretch passing through said pixel; calculating for each pixel of the structure a third index representative of the orientation of the stretch of structure passing through said pixel; and determining, for each pixel of the structure having a corresponding pixel in the mesh pattern belonging to the mesh, if said pixel of the structure belongs to a predetermined defect on the basis of the comparison of the third index and the second index associated with the corresponding pixel in the mesh model.

However, said systems have a drawback due to the fact that in order to obtain a quality control to be used "in-line" in a tire production plant, the control itself must be performed faster and at limited costs; in this context, the computing demand of processing algorithms is crucial, because when it is excessive, the control time is stretched unacceptably and/or the necessary calculation capacity makes the control unfeasible.

Patent document US2016320265 illustrates a method for detecting defects on tires in a tire production process and includes the following steps: providing a tire; acquiring a three-dimensional image of a surface portion of the tire; generating, as a function of the acquired image, a plurality of values which indicate the measure of a profile height of the tire surface portion to be tested; processing, as a function of the plurality of acquired values and according to an interpolation of a plurality of values which indicate an estimation of the tire surface portion to be tested with respect to a reference profile; calculating, as a function of said measured values respect to those of a reference profile, and comparing the values obtained in order to detect possible defects on the tire surface portion.

The technology underlying said method uses matrix cameras detecting defects only on surface portions of a tire and not on the entire tire; the method does not detect defects by means of techniques based on RGB color detection.

Patent document WO2016103131 illustrates a method and an apparatus for detecting defects on tires based on a comparison between a reference image of a defect-free portion of the surface of a tire and a sample image of a portion of the surface of the tire to be tested, illuminated by a sidelight source in order to detect possible defects.

The method according to the said document uses a specific apparatus and is not a complete machine; it tests portions of the surface of the tire and not the entire tire; in order to detect the defects, it uses a technology which is based on the use of sidelight to highlight protrusions or defects of the tire to be tested and to provide a model of it by acquiring two-dimensional images and not provide a three-dimensional model.

In patent document U.S. Pat. No. 7,805,987, differential expansion (or contraction) of s of a tire sidewall is measured by constructing height profiles of the tire at each of at least two different static pressures to detect defects in the tire; light sources project a plurality of illuminated lines onto a tire and cameras are used to record the position of the lines to construct the height profiles of a rotationally fixed position tire.

The method is based on the detection of macroscopic defects by inflating the tire at different pressures and consequently examining the variation of the positions of the light lines projected onto the tire and acquired by a camera;

it does not perform any detection 3D and cannot examine for small deformations and defects on the surface of the tire to be tested. The method is used to detect large structural defects of the tire which are highlighted by inflating the tire at different pressures and plotting the profile of the tire as a function of the position of the projected lines. In all cases, as the tire must be inflated, it must be mounted on a rim and the apparatus is designed to test off-line. Furthermore, said method cannot be applied to the inner sections of the tire.

In the method shown in patent document WO2011115256, the surface of the tire to be analyzed is irradiated with polarized light, the polarized light reflected by the tire surface is detected by a camera which measures its intensity and identifies irregularities; the camera is preferably equipped with a polarizer having at least three or more different directions.

The aforesaid apparatus employs polarized light and a camera which allows to detect and highlight a tire defect but does not allow its characterization. The present patent document, by using light as a significant element for detecting defects, does not allow the detection of minor defects as a result of the different reflection due to the different conformation of the tire, to its variable light absorption features as a function of the angle of incidence, of the curvature of the tire and of various sizes that the tire assumes in space at the end of the vulcanization step, when the tire is not inflated and mounted on a rim. Furthermore, said method cannot be applied to the inner sections of the tire.

SUMMARY OF THE INVENTION

The main object of the present invention is to overcome most of the drawbacks of the prior art technologies for detecting the defects of a tire by means of a complete quality control apparatus which is fully integrated and autonomous to be inserted as-is at the end of the production process. For this purpose, the present invention provides a method and respective apparatus for detecting the presence of defects on all the surfaces of a tire at the end of its production process by using advanced digital detection instruments, which provide high-resolution viewing.

The amount of data collected by said digital detection means is processed by appropriate processing means, which, by means of complex specially developed algorithms, test every surface and portion of the tire, identifying possible defects and providing useful data to define the tires to be rejected or to be repaired and informations upstream of the production process to implement appropriate corrective measures to reduce rejects.

Further objects and advantages of the method and the relative apparatus according to the present invention are:
- it enables to perform a 3D reconstruction of all tire surfaces;
- it enables to detect 3D defects which modify the tire surfaces (scratches, scrapes, bubbles, detachments, cracks, bladders, missing parts, foreign bodies, excesses of rubber, lack of rubber, etc.), but also structural defects which alter the geometry of the tire (eccentricity, presence of flat portions along the circumference of the tire, thickness of tire parts, distances exceeding acceptability limits, etc.);
- testing and detecting defects is possible on each inner or outer surface of the tire and on any sector thereof (tread, edge, sidewall, shoulder, bead, side);
- it enables to detect the presence of unexpected colors due to incorrect printing of colored characters; the use of color can produce defects due to:
  - the incorrect position of colored lines,
  - the incorrect position of the commercial code,
  - color smudges on the lines and on the commercial code,
  - differences of the color intensity due to the writing step on the tire,
  - differences of color with respect to the tire model,
  - partial highlighting the tire brand lettering;
- it enables to identify variations of the shades of the black color of the tire which indicate defects originating from contamination of the rubber compound, escapes of steam during the vulcanization step or the lack of some layers in the assembly step (the inner steel wires sections of the tire can be seen);
- it can be applied to any type of tire: tires, as a function of the commercial code, have different rim, tread and shoulder sizes;
- it can be integrated into the end of any production line, either new or for retrofitting of production lines already operating in the sector: the apparatus interfaces with the production line using standard protocols (Profibus, Ethernet TCP/IP, Modbus, etc.);
- it enables to test all tires manufactured on site and not in the laboratory;
- it enables the automatic and integrated management of the different types of tire which arrive at end of the production line in a random sequence.

For said purposes and advantages, the invention provides a method and apparatus for three-dimensional viewing and color analysis which automatically detects any defect present on the tire at the end of the production cycle.

The apparatus uses "laser profilometry" technology to identify and recognize the defects present on the surface of a tire.

This innovative technique is applied in various sectors for checking surfaces and there are standard products, 2D and 3D smart sensors, which integrate laser and camera, complete with optics, within the same container.

Said products, using software algorithms present onboard, enable to perform the three-dimensional analysis of small objects, measure of height, length, width, inclination and volume referred to individual surfaces.

Said technology (laser profilometry), by means of reconstructing and the successive processing of a three-dimensional model of the entire tire, allows to detect the presence, automatically recognize and classify all types of structural defects or surface defects with high efficiency and a considerable saving in terms of time and costs.

Furthermore, by using RGB color cameras, the apparatus recognizes color defects on the outer surfaces, tread and shoulder, of any tire, regardless of manufacturer and size.

The apparatus uses five laser-camera assemblies, which enables to test all inner and outer sections of any tire, regardless of manufacturer and sizes of the tire, and three high-resolution RGB camera-illuminator assemblies, which enables to test the outer sections, tread and shoulders.

The laser-camera assemblies and the RGB camera-illuminator assemblies, mounted on automated guides with axes, are automatically positioned in programmed positions, as a function of the size of the tire to be tested in order to scan every millimeter of it.

In order to test the defects on the inner and outer surfaces of the tire it must be scanned throughout all its portions.

The three-dimensional images of all its sections and the color images of the tread and of the outer shoulders are then processed by a defect analysis software, having identified the specific portions which will be processed in case of differences with respect to the model of the tire being tested; if defects are identified, the tire will be scraped or repaired.

BRIEF DESCRIPTION OF THE FIGURES

Further features and advantages of the present invention will be apparent in the light of the detailed description of a preferred, but not exclusive, embodiment of a method and apparatus for checking the defects of a tire at the end of the production process, illustrated by way of non-limiting example, with the aid of the accompanying drawings, wherein.

Figure 1:
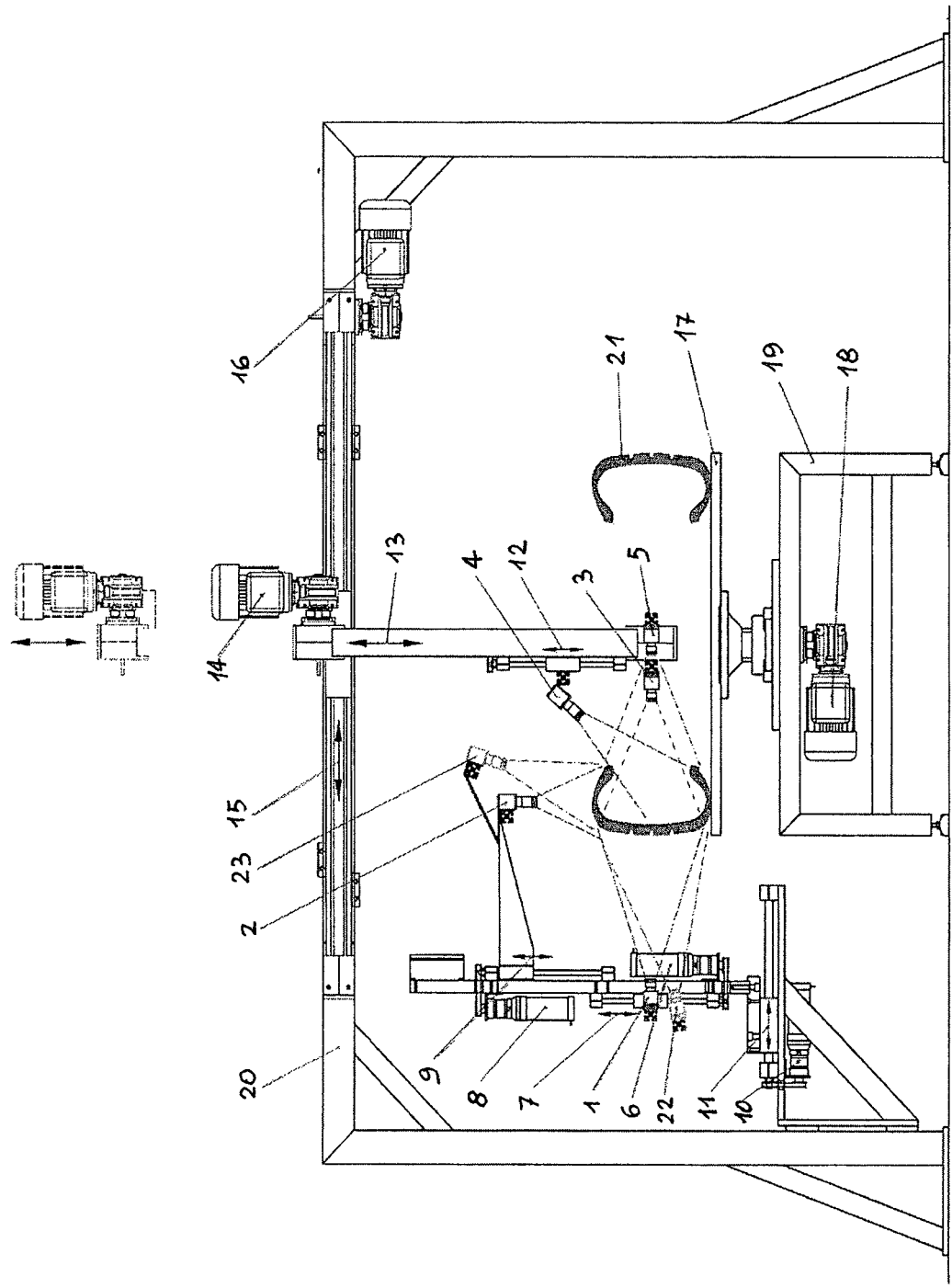
FIG. 1—a layout of the apparatus provided with a single control station.

A key of the numeric references used follows for the sake of clarity:

1 profilometer for scanning the outer surface of the tread
2 profilometer for scanning of the outer surface of a shoulder and, after overturning of the tire, of the other one,
3 profilometer for scanning the inner surface of the tread
4 profilometer for scanning of the inner surface of a shoulder and, after overturning of the tire, of the other one,
5 profilometer for scanning the rim-tire coupling bead portion
6 tread profilometer ratio motor on Z axis
7 tread profilometer on Z axis
8 outer shoulder profilometer ratio motor on Z axis
9 outer shoulder profilometer on Z axis
10 outer profilometer ratio motors on X axis
11 outer profilometer on X axis
12 inner shoulder profilometer on Z axis
13 inner profilometer on Z axis
14 inner profilometer ratio motor on Z axis
15 inner profilometer on X axis
16 inner profilometer ratio motor on X axis
17 rotating table
18 rotating table ratio motor
19 workbench
20 inner profilometer swift on axis X-Z
21 tire
1. outer surface of the shoulder
2. inner surface of the shoulder
3. outer surface of the tread
4. inner surface of the tread
5. tire-rim coupling bead portion
22 RGB color camera for detecting the outer surface of the tread
23 RGB color camera for detecting the outer surface of the outer side shoulder and, after overturning of the tire, of the other one.

DETAILED DESCRIPTION OF PREFERRED EMBODIMENTS

With reference to said figures is provided in the following the description of some example embodiments of an apparatus for detecting the defects of a tire 21 at the end of the production process provided with the following main elements:

a workbench 19, including a rotating table 17, for supporting and moving the tire 21 to test,
profilometer means 1, 2, 3, 4, 5, for scanning the surface of various sections of tire and for detecting the profiles, provided with devices adapted to project a laser line on the surface to be measured and continuously acquire the profile drawn from light by means of linear camera,
high-resolution RGB color linear camera means 22, 23, for scanning the outer portions of the tire, tread and shoulders, and creating color images,
mechanical means 7, 9, 11, 12, 13, 15, 20 for supporting and moving said scanning assemblies (profilometers and RGB color cameras),
means 6, 8, 10, 14, 16, 18 respectively electromechanical automation means (motors, brushless, sensors) and electronic devices means (PLC, inverter, drive brushless motors and controlled axes) for managing and operating said electromechanical automation means,
computer mean provided with suitable software for processing the data coming from the profilometers and from the RGB color cameras, creating a 3D model and color model of the tire under test, and managing a database related to all features of the manufactured tires, both those of the automation setting and those of models for analyzing 3D and color defects,
operator interface, installed aboard the computer, for the interaction between production operator and the apparatus.

The scans performed simultaneously by the profilometers and by the RGB cameras are obtained by turning at controlled speed the rotating table 17 on which the tire 21 is placed, while the detection, characterization and classification of one or more defects are performed univocally by the software by means of algorithmic comparison between the detection zone of the tire sample to test, which is scanned, and the corresponding one of the defect-free reference tire sample.

Figure 2:
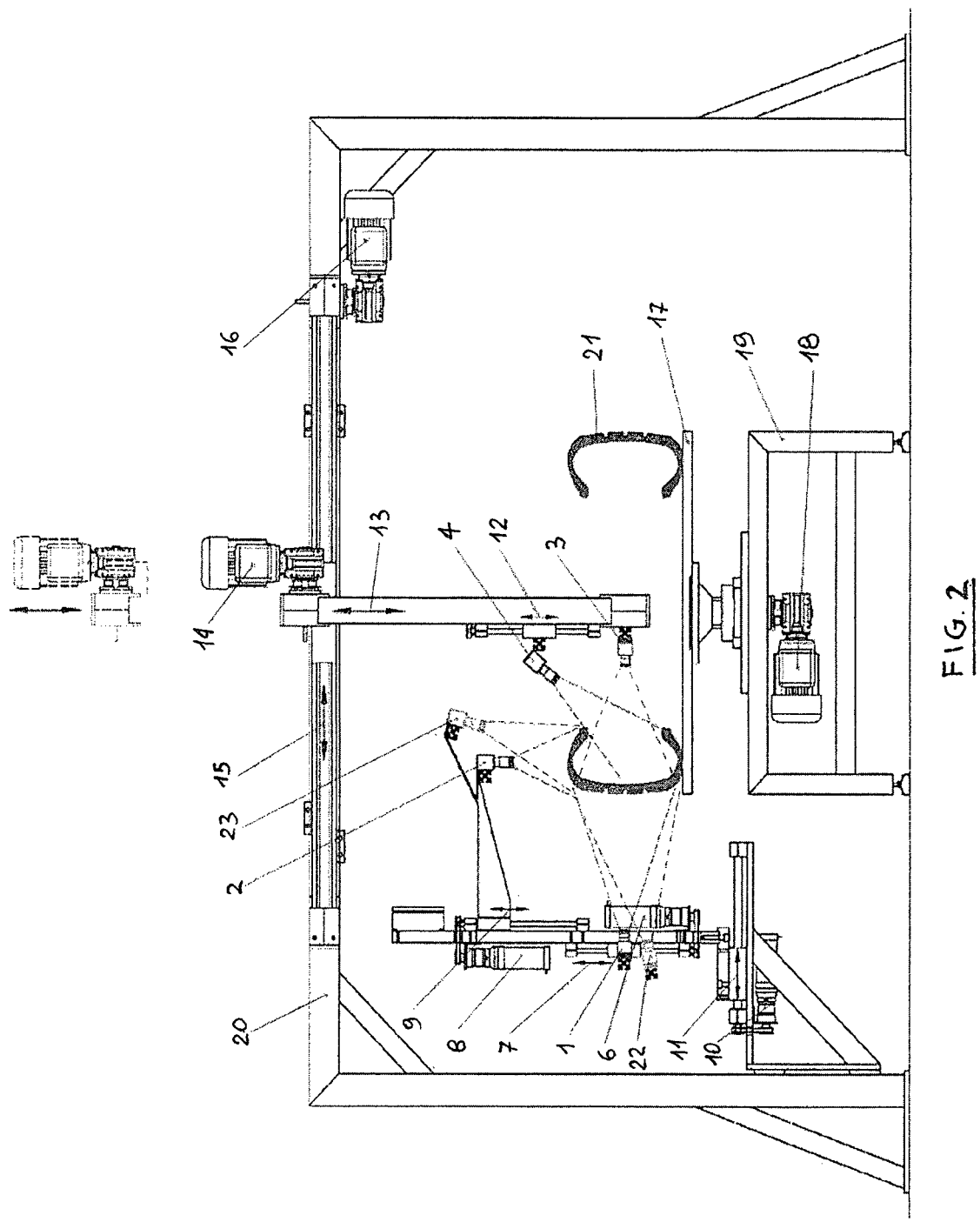
FIG. 2—a layout of a control station in an apparatus provided with two stations.
Figure 3:
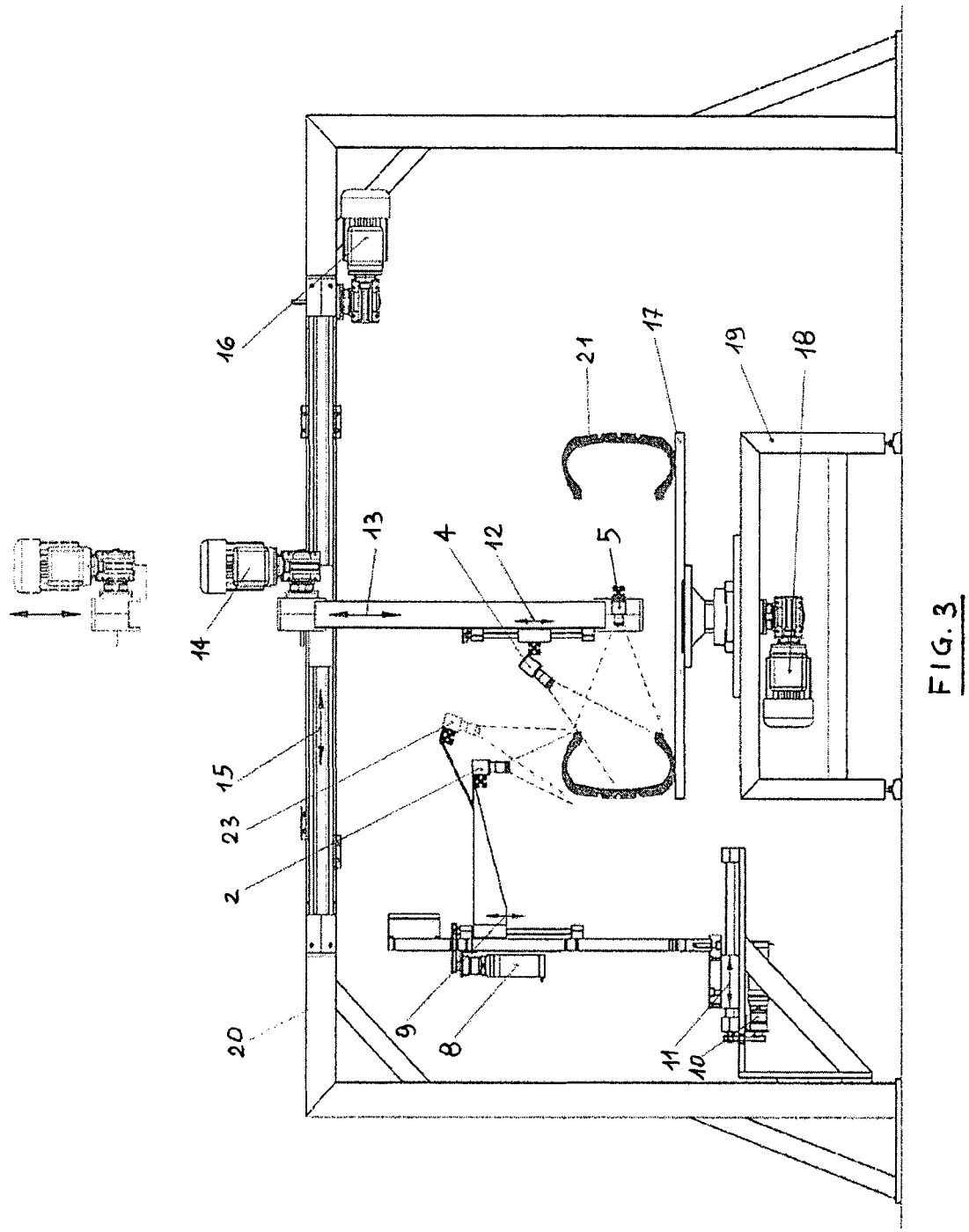
FIG. 3—a layout of another control station of the apparatus in FIG. 2.

The apparatus according to the present invention, shown in some layout respectively with a single test station (FIG. 1), with two stations (FIGS. 2 and 3), enables to check and detect the defects of the tires by means of laser profilometry technology for the acquiring the individual profiles of the surfaces to test.

The laser profilometers 1, 2, 3, 4, 5, use triangulation method in order to detect the profile of the surfaces and perform measurements on the surfaces themselves.

The technique is to project a laser line on the surface to be measured and to continuously acquire, by means of a linear camera positioned at an angle of 25-45° with respect to the laser, the profile drawn by the light and thereby recording the dimensions along the two axes X and Z.

In order to obtain the 3D image, the laser device performs a relative movement also along the Y axis, whereby continuously acquiring the profiles shown by the camera; said movement is obtained by rotating at controlled speed the table 17 on which the tire is placed.

A software, specifically developed for the application, performs the assembly of the single profiles acquired along the Y axis and thus allows the 3D reconstruction of the scanned surface.

Each profilometer is provided with linear camera and independent laser, with the technical features required for the section of the tire to be analyzed (acquisition speed of the camera, resolution, optics, filters, laser power, distances between the laser and camera, framed portions, etc.).

The apparatus requires the use of hi-tech products, selected on the market as a function of the required features and their application and integration in the system.

The reconstruction of the three-dimensional image of the single surface is obtained starting from the primitive function obtained by means of the cameras in form of software data, or clouds of points in space of the single profiles; said primitive function are integrated in a high-level software which creates the 3D model of the entire scanned surface (tread, shoulder, bead portion).

Figure 4A:
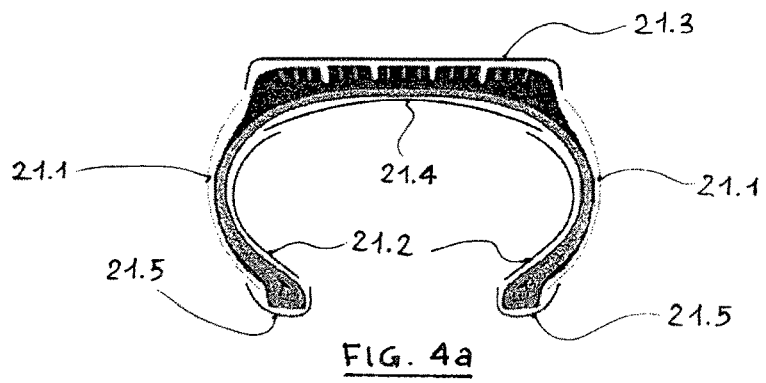
FIG. 4—a) sections both inner and outer which compose the tire and may present defects, b) tire portions with which the various profilometers are associated in order to be able to scan the entire tire, c) tire portions scanned by the RGB color cameras.
Figure 4B:
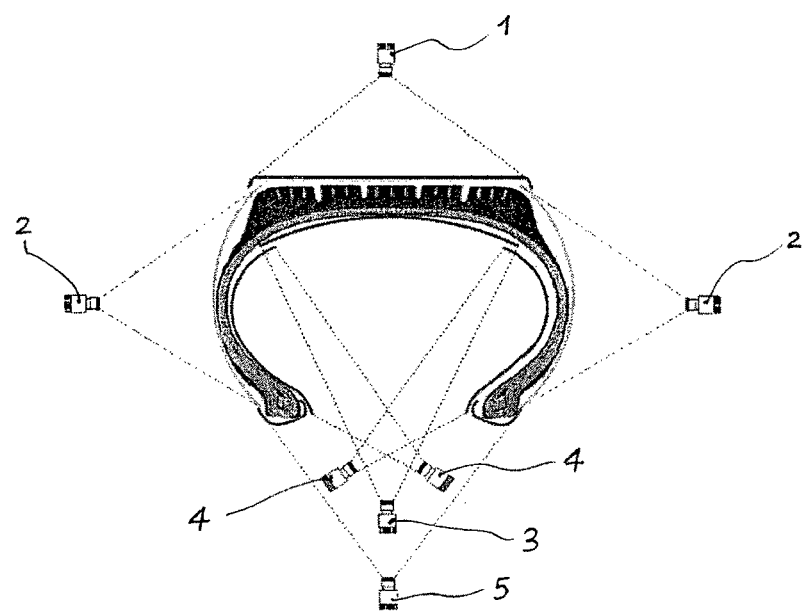
Figure 4C:
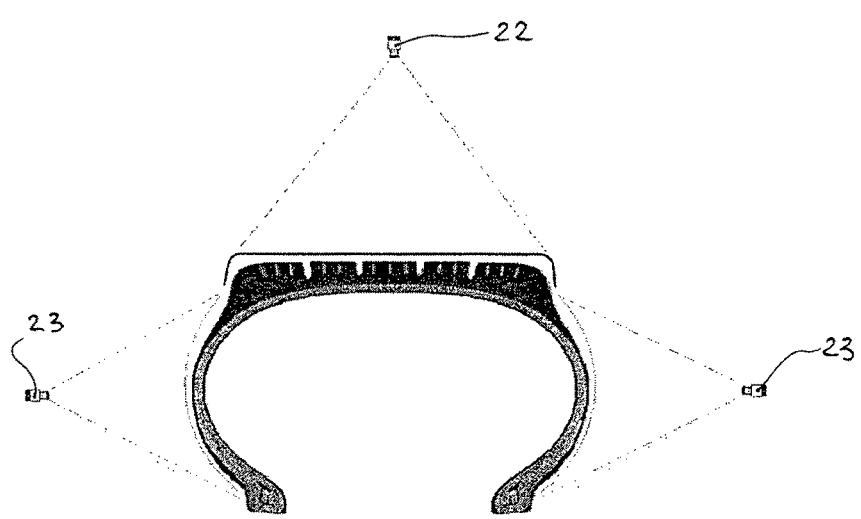

As shown in FIG. 4, a suitably dimensioned laser unit-camera is installed for each of the surfaces which form the tire, inner surface 21.4 and outer surface 21.3 of the tread, inner surface 21.2 and outer surface 21.1 of the shoulder, rim-tire coupling bead portion surface 21.5, for a total of five, each of which provides the 3D image of the surface associated with it.

All acquired images, obtained by creating a relative movement between tire and laser-camera system, are processed to obtain the 3D model of the complete tire that will be processed by the defect processing software installed on the apparatus.

For analyzing the defects of specific and small size portions of tire, or for small size tires, such as for example tires for motorcycles, which require less stringent technical features than those of standard products available on the market, the apparatus according to the present invention uses, for some sections of the tire, standard profilometers instead of the laser unit-camera, integrating them in the apparatus as smart sensors.

Each profilometer acquires therefore in sequence the profiles of the section of the rotating tire, constituted by clouds of points in space, with which it is associated (tread, shoulder, etc.).

These profiles, 8,000-12,000 profiles per tire, are stored by the processing computer.

Figure 5:
FIG. 5—a 3D reconstruction, after scanning, of the outer shoulder of a tire.
Figure 6:
FIG. 6—a 3D reconstruction, after scanning of the outer surface of the tread of a tire in which an abrasion defect is present.
Figure 7:
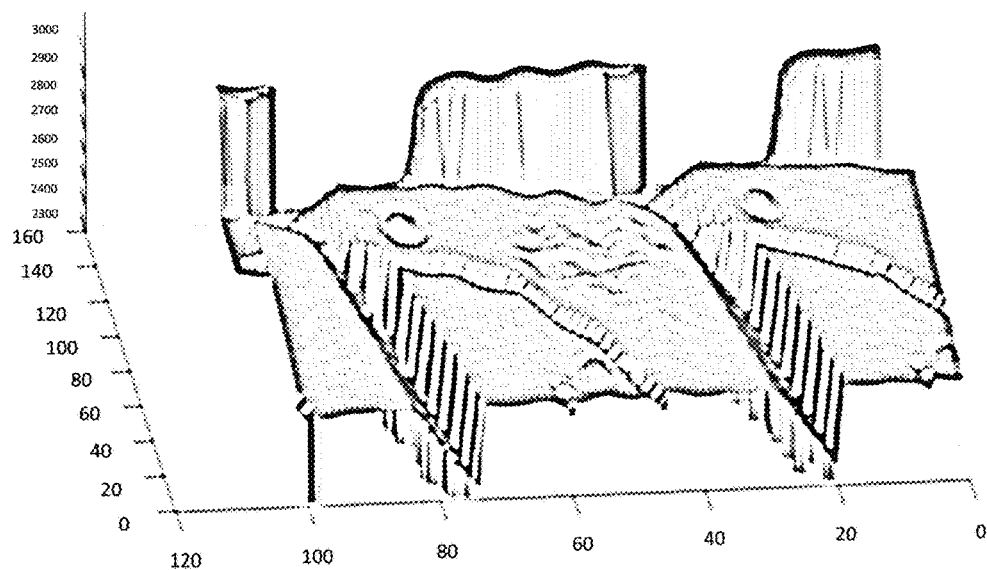
FIG. 7—a 3D reconstruction, after scanning, of the tire surface in FIG. 6 and of the position of the single points which compose it.

The three-dimensional image of the surface of the tire to test, see FIG. 5, obtained by using the software of the apparatus, starting from the software primitive function of the cameras, contains the X-Y-Z coordinates for each point in the space of the tire itself; for example, the tread shown in FIG. 6 containing an abrasion defect, shows the X-Y-Z coordinates of each point in the 3D reconstruction of the same section, see FIG. 7.

For each commercial code of the tires manufactured in a plant, a model is created starting from a defect-free reference tire sample: all tire surfaces are scanned to create the model.

During this step, the model creation software requires the presence of the production engineer who, by means of the user-friendly interface with which the apparatus is equipped, interacts with the system to select the portions for defining the parameters of acceptability of the tire in all its portions and for setting the parameters of each defect.

At the end of the creation step of the 3D model, it is stored in the database, matching it with the commercial code of the tire.

During the production step, the tire is tested by automatic scanning, reconstructing the 3D image and comparing the areas and portions of the tire with the corresponding default 3D model.

The portions on which are found differences with respect to those of the default model are subjected to a successive analysis for identifying the defect: the processing is performed specifically for each classified portion in which the defect is present, according to parameters set during the model creation step.

Figure 8:
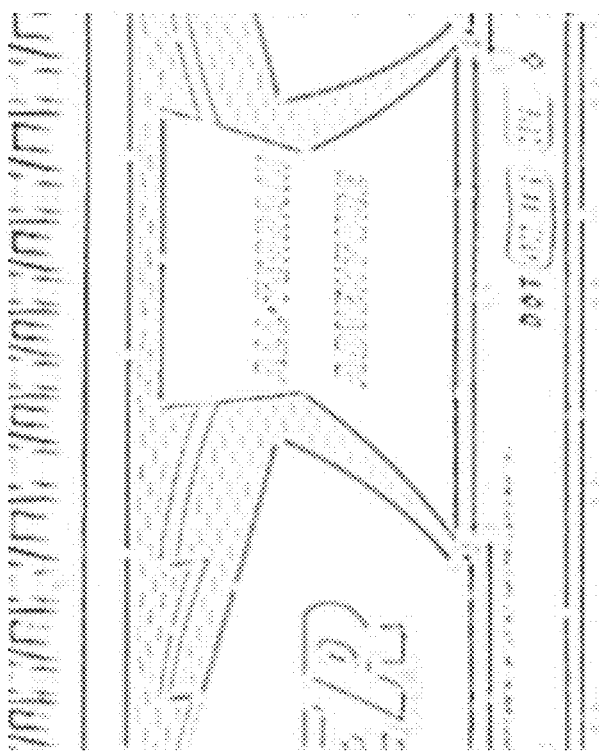
FIG. 8—a 3D reconstruction, after scanning, of the section of the outer shoulder of the reference tire sample.
Figure 9:
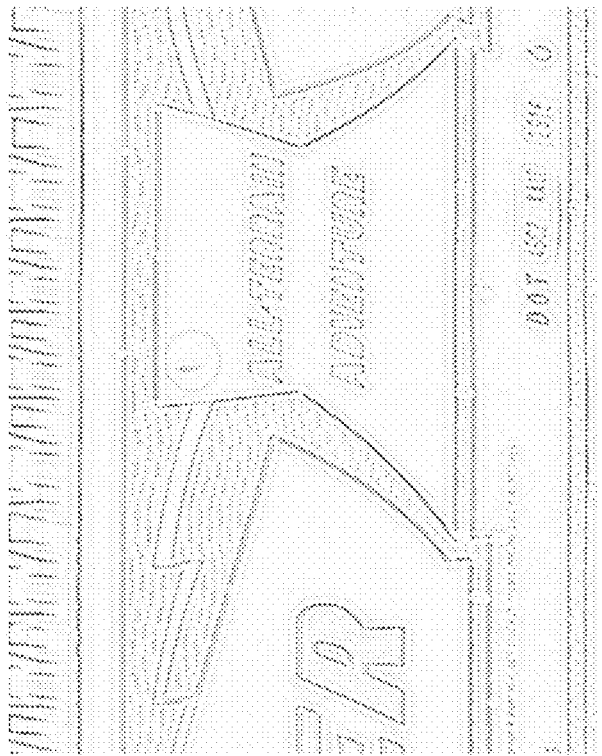
FIG. 9—a 3D reconstruction, after scanning, of the section of the outer shoulder corresponding to that in FIG. 8 of a sample of tire to be tested which has a defect in the highlighted portion.
Figure 10:
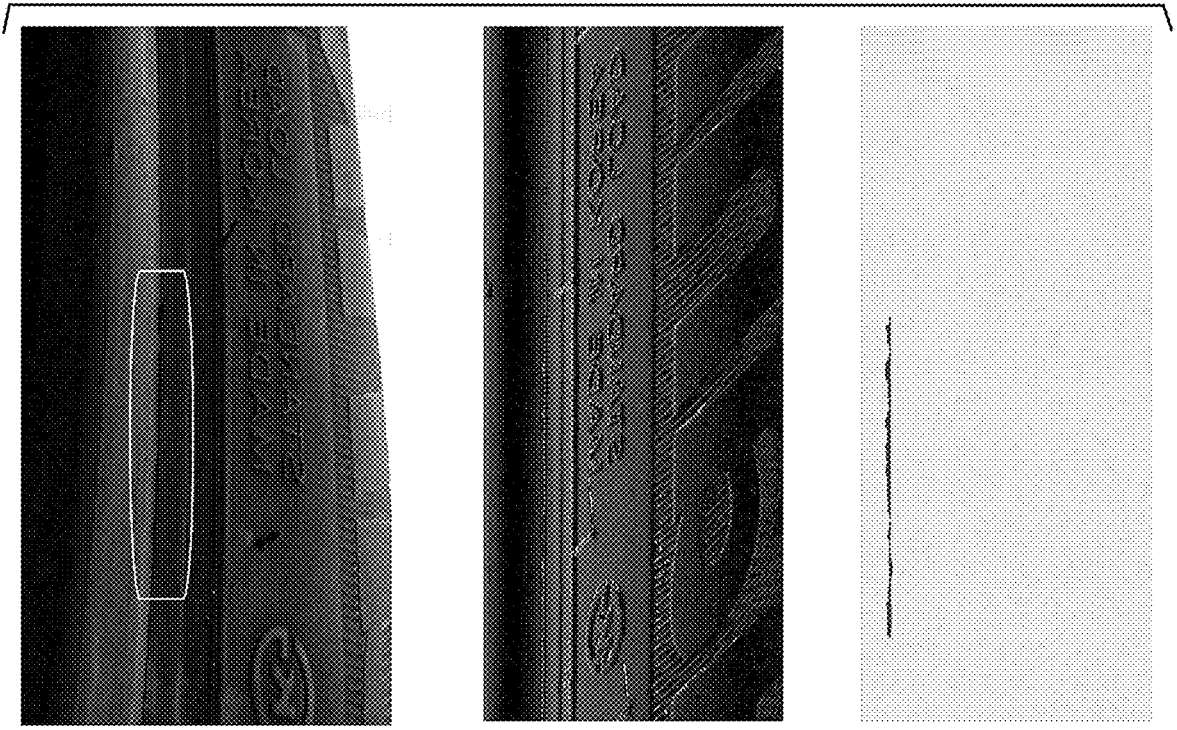
FIGS. 10, 11, 12, 13—some structural and surface defects which may occur on the tires.
Figure 11:
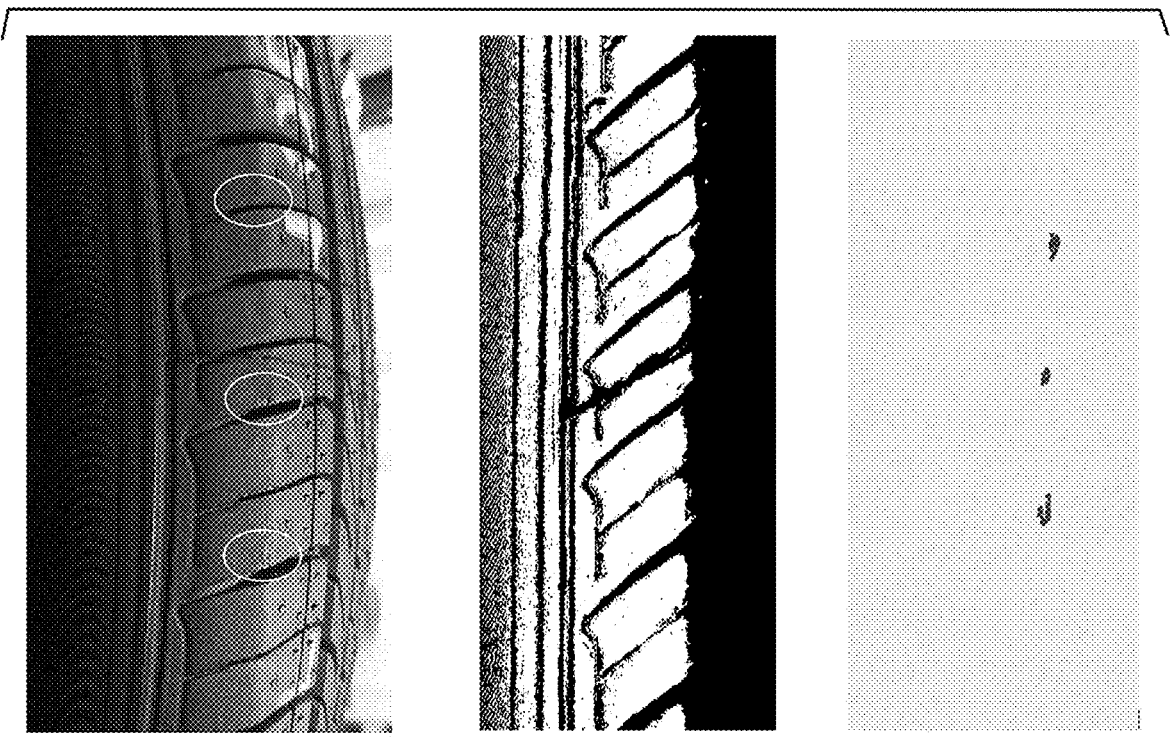
Figure 12:
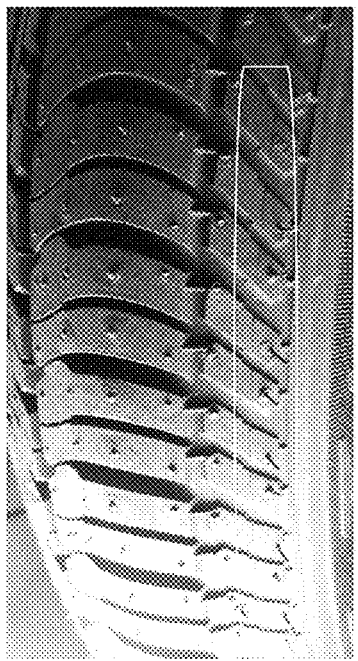
Figure 12:
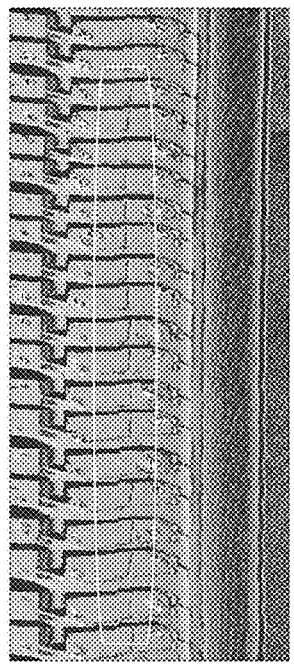
Figure 12:
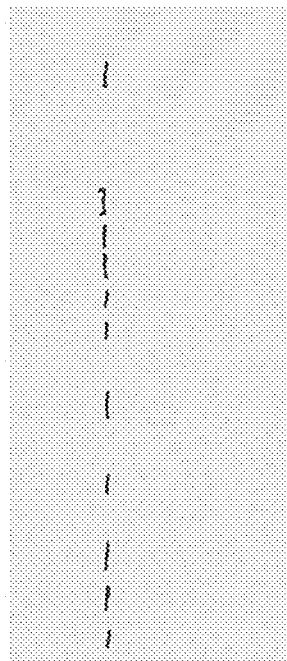
Figure 13:
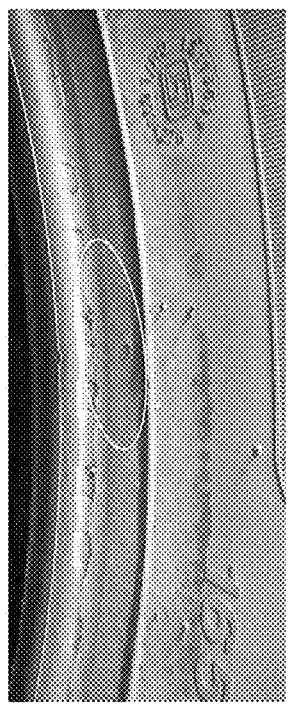
Figure 13:
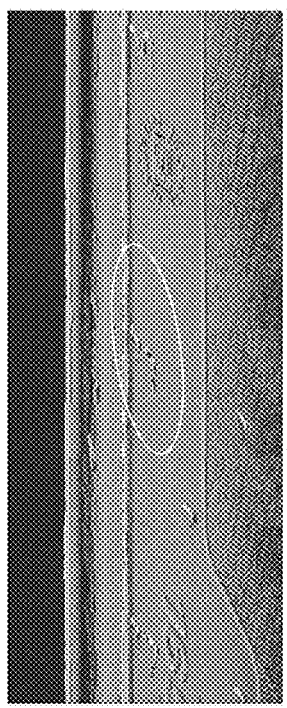
Figure 13:
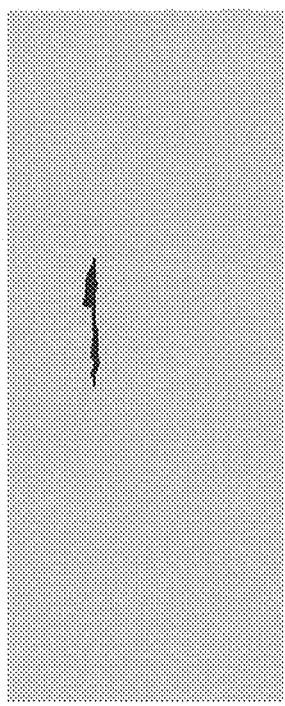

FIGS. 8 and 9 show two 3D images obtained after scanning the section of the outer shoulder of a tire: the first is the one related to the section of the shoulder of the model of the reference tire sample and the second is the same section of the tire to test, which has a defect in the highlighted portion on the inside of the rim; as can be seen, the two images are identical with the exception of the defect present inside the highlighted circle.

The apparatus according to the present invention also allows analyzing color defects, which are very important because tire manufacturers use color for different purposes during the production step.

These defects are identified by using high-resolution linear RGB color cameras present in the apparatus, which scan the outer portions of the tire tread and shoulders, and create the color images of the portions. By analyzing the images, as a function of color images previously stored of the same tire model, it is possible to examine the dissimilarities of the tire to test against the reference sample and to determine the defects arising from color differences on the tire surfaces.

The steps that the apparatus automatically performs during the entire defect examination time are illustrated:

a. picking the tire to test from the production line and positioning the same on the rotating table of the apparatus; the tire is picked by a robot, or specific machine, which guarantees the centering of tire on the rotating table of the apparatus;

b. starting the automatic positioning, as a function of the tire type, of the moveable equipment of the profilometers and of the RGB color cameras mounted on controlled axes;

c. start rotating the rotating table on which the tire is placed to perform a 360° full scan and at the same time to acquire the profiles and color defects along the entire circumference, inside and outside, of the tire (tread outer surface, shoulder outer surface, tread inner surface, other shoulder inner surface, rim-tire coupling bead portion);

d. processing the acquired profiles, 3D reconstruction of the surfaces and reconstruction of the images acquired by the RGB cameras;

e. detecting one or more defects, by comparing the tire sample to test, already scanned, and a corresponding defect-free reference tire sample (of the same model/ type); the defect is detected by means of algorithmic comparison between the detection portion of the tire to test and the corresponding one of the reference sample; sophisticated algorithms enables to univocally identify, characterize and classify any defect (type, shape, size, color, etc.);

f. stopping and repositioning in the starting conditions said profilometer means and said RGB cameras;

g. automatic overturning of the tire and positioning it on the same rotating table to allow the apparatus to scan the remaining surfaces of the tire, previously not available;

h. repeating steps b, c, d, e, f;

i. final picking of the tire at the end of the test operations and repositioning the same on the production line depending on the result of the test defect; the picking of tire is performed by a robot, or a specific machine.

The cycle described above relates to the single test station apparatus (illustrated in FIG. 1) provided with a single rotating table on which the scanning of the tread, inner and outer surface, of an outer shoulder and, after overturning of the tire, also of the other one, of an inner shoulder and, after overturning of the tire, also of the other one and of the rim-tire coupling bead portion.

The cycle time required for analyzing a tire according to said process is about 60 seconds.

When short cycle times defect analysis is required, the apparatus is equipped with two stations (FIGS. 2 and 3), which are mechanically perfectly identical and each equipped with the profilometers and RGB cameras needed for scanning the assigned surfaces.

The operation and the defect scanning and analysis software is perfectly equal to the one installed on the single station apparatus, and the stations are duplicated only to allow scanning two tires at the same time, with an evident reduction of the cycle time, enabling to obtain cycle times of about 40 seconds for each tire during a complete test.

FIGS. 10, 11, 12, 13 show, as an example, some structural and surface defects which may appear on the tires; three images are associated with each defect:

photo of the tire: a photo of a tire section with a defect,
3D reconstruction: 3D image reconstruction of the tire section where the defect is located,
processing results: the identified defect with indication of position and size.

Figure 14:
FIGS. 14, 15, 16—some color defects which may occur on the tread of the tires, relative to barcodes, lettering and reference commercial codes.
Figure 15:
Figure 16:

FIGS. 14, 15, 16 show, as an example, some defects that may appear on the tread of a tire relative to the barcodes, lettering and commercial reference codes: incorrect positioning of lines (FIG. 14), distorted letters (FIG. 15), incorrect lettering positioning (FIG. 16).

The apparatus and the method according to the present invention allow the following improvements compared to current technologies:

a full analysis of the inner and outer sections of the tire, by scanning using laser profilometers and RGB cameras (scanning of each part of the tire, even the most hidden);

the automatic positioning, as a function of the tire type, of moveable equipment of the profilometers and inner and outer RBG cameras;

matching of dual optical detection technology by means of laser and RGB cameras;

detecting, 3D modeling and classification of each surface and color defect by matching said technologies.

Inserting an automatic defect examination station in the production line, replacing the manual station with operator (three specialized operators on three work shifts), also makes it possible:

to obtain a considerable yearly saving, in addition to the obvious advantages of result objectivity and of guaranteed analysis times, to automate the quality examination process of tires at end of the production line which today is particularly expensive and critical, particularly in certain geographical areas in which the operators are not particularly skilled or trained, to solve quality problems by reducing the possibility marketing products with defects not detected manually by the operator.

The cycle time of the method is 40-60 seconds for each tire to test; said time is perfectly comparable to the time currently employed by a qualified operator, but guaranteeing higher efficiency because it is a fully automatic apparatus having much greater result repeatability and guarantee than that of a single operator.

The defect detection apparatus according to the present invention, shown in some preferred embodiments, is modular and is susceptible to numerous modifications and variants according to manufacturing demands, the operating principle remaining unchanged. In some manufacturing processes, it could be necessary, for example, to vary the number and the position of the detection devices (profilometers and RGB cameras) or in other cases the presence of some of them or not.

Indeed, the need may arise that the detection of color defects of the tires is not needed, or the installation of RGB cameras for detecting color defects inside the tire is needed (defects due to contamination of the rubber or escape of steam from the balloon of the vulcanization press).

Another possibility could be given by the need to provide the apparatus with a specific external profilometer for detecting surfaces of special tires which require a more detailed defect analysis, for example for the manufacturing of low-profile tires, in which the size of the shoulder is much lower or other tires with special profiles, also subject to new design.

For the production of tires of particular manufacturers, it could be necessary to insert profilometers and/or additional axes in the apparatus in order to be able to scan specific parts of the tire.

The apparatus performs the 3D reconstruction of all surfaces of a tire, also of the surfaces of the shoulders on which reference letters and commercial codes are printed; this is necessary in cases in which said codes are not supplied by the production line before setting the apparatus.

For recognizing said lettering and codes, the apparatus is equipped with specific software, which uses OCR (Optical Character Recognition) algorithms.

By means of the apparatus, it is possible to detect any type of defect present on a tire with variable shape, color, size.

The apparatus according to the present invention is also applied to maintenance checks and examinations of the state of tires outside the production process.

The object of the invention is susceptible to many changes and variations, all falling within the inventive concept expressed in the attached claims.

All parts may be replaced with other technically equivalent elements, and the materials may be different according to needs, without departing from the scope of protection of the present invention.

Although the object was described with particular reference to the attached figures, the reference numbers used in the description and in the claims are used for a better understanding of the invention and do not constitute any limitation to the disclosed scope of protection.

The invention claimed is:

1. An apparatus for detecting and checking defects on a tire at the end of a production process, the apparatus comprising a workstation comprising:
    a workbench comprising a rotating table for supporting a tire being tested;
    a profilometer for scanning and detecting a sequence of images referring to the profile of the internal and external surfaces of the tire;
    a high-resolution color linear camera for scanning outer surfaces of tire tread and tire shoulders;
    a mechanical support for the profilometer;
    a mechanical support for the color linear camera;
    a data processor for storing and processing data detected by the profilometer and the color linear camera, for generating a three-dimensional model of the tire, and for management of a database including parameters referring to surface characteristics of defect-free tires;
    an interface for facilitating interaction between an operator and the apparatus;
    wherein the profilometer and the color linear camera are configured to operate simultaneously and perform a full scan of all the profiles of inner and outer surfaces of the tire while the tire is in rotation at a controlled speed on the rotating table;
    wherein the data processor is adapted to define and classify defects detected, by comparing parameters detected by the profilometer and the color linear camera to at least one corresponding parameter of a defect-free tire of a same type as the tire being tested.

2. The apparatus according to claim 1 wherein the data processor is adapted to define and classify defects detected by algorithmic comparison of parameters detected by the profilometer and the color linear camera to the at least one corresponding parameter of a defect-free tire of a same type as the tire being tested.

3. The apparatus according to claim 1 wherein the profilometer comprises five profilometer units.

4. The apparatus according to claim 3 wherein the color linear camera comprises two high definition color linear camera units.

5. The apparatus according to claim 1 wherein the apparatus is adapted to complete scanning of one side of a tire in 60 seconds before overturning the tire.

6. The apparatus according to claim 1, wherein the profilometer comprises:
    at least one profilometer unit for scanning an outer surface of tread of a tire being tested;
    at least one profilometer unit for scanning an outer surface of a first tire shoulder and a second tire shoulder opposite the first tire shoulder without overturning the tire;
    at least one profilometer unit for scanning an inner surface of the tread;
    at least one profilometer unit for scanning the inner surface of a shoulder of the tire and an inner surface of an opposite shoulder without overturning the tire; and
    at least one profilometer for scanning a surface of a bead of the tire.

7. The apparatus according to claim 6, wherein the color linear camera comprises at least one color camera unit for scanning the outer surface of the tread and at least one color camera unit for scanning the outer surface of a shoulder of the tire and, without the overturning of the same, the surface of the opposite shoulder.

8. The apparatus according to claim 1 wherein the profilometer comprises a plurality of profilometer units, each comprising:
    a laser device for detecting a profile of the tire; and
    a linear camera on each profilometer unit, oriented at an inclination between 25° and 45° with respect to the laser device, for continuous acquisition of parameters detected by the laser device.

9. The apparatus of claim 6 wherein each profilometer unit comprises
    a laser device for detecting a profile of the tire; and
    a linear camera on each profilometer unit, oriented at an inclination between 25° and 45° with respect to the laser device, for continuous acquisition of parameters detected by the laser device.

10. The apparatus according to claim 7 wherein the linear camera on each profilometer unit is controlled with respect to image acquisition speed, resolution, optics, and filter; and each laser device is controlled with respect to power, distance from a corresponding profilometer linear camera, and tire areas detected referring to the laser device.

11. The apparatus of claim 1 wherein the data processor is adapted to generate the three-dimensional model of the tire based on measurement of height, length, width, and inclination of surfaces.

12. The apparatus of claim 11 wherein the three-dimensional model is of the entire tire surface including tread, shoulders, and beads.

13. The apparatus of claim 1 wherein the data processor is adapted to store 8,000 to 12,000 profiles per tire.

14. A method to perform checking and detecting of surface defects of a tire at the end of a production process by means of the apparatus according to claim 1, where the method comprises the following steps:
    a. removing a tire to test from a production line and positioning the tire to test on the rotating table of the workbench;
    b. operating the mechanical supports for the profilometer and the color camera to position the profilometer and color linear camera for scanning the tire to test;
    c. determining a rotation speed of the rotating table on which the tire is placed, in order to perform its complete 360° scan;
    d. processing the parameters detected by the profilometer and the linear color camera means, and providing a three-dimensional model of the tire on the basis of the parameters detected;
    e. characterizing and classifying surface defects, if detected, by comparison of the parameters detected to at least one corresponding parameter of a defect free tire of the same type as the tire being tested;
    f. stopping and repositioning in the profilometer and linear color camera with respect to starting conditions;
    g. overturning the tire on the rotating table to allow the scanning of remaining unscanned surfaces;
    h. repeating steps b, c, d, and e;
    i. removing the tire and repositioning the tire in a position in the production line that depends on results of the foregoing comparison.

* * * * *